United States Patent
Farrell

(10) Patent No.: US 12,130,903 B2
(45) Date of Patent: Oct. 29, 2024

(54) SOFT PART AUTHENTICATION FOR ELECTRONIC CONTROL UNIT

(71) Applicant: GM GLOBAL TECHNOLOGY OPERATIONS LLC, Detroit, MI (US)

(72) Inventor: Brian Farrell, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 406 days.

(21) Appl. No.: 17/697,291

(22) Filed: Mar. 17, 2022

(65) Prior Publication Data
US 2023/0297663 A1 Sep. 21, 2023

(51) Int. Cl.
| G06F 21/44 | (2013.01) |
| G06F 8/65 | (2018.01) |
| H04L 9/08 | (2006.01) |
| H04L 9/32 | (2006.01) |

(52) U.S. Cl.
CPC ............... *G06F 21/44* (2013.01); *G06F 8/65* (2013.01); *H04L 9/0866* (2013.01); *H04L 9/0869* (2013.01); *H04L 9/3242* (2013.01); *G06F 2221/2103* (2013.01)

(58) Field of Classification Search
CPC .... G06F 21/44; G06F 8/65; G06F 2221/2103; H04L 9/0866; H04L 9/0869; H04L 9/3242
USPC .......................................................... 726/2
See application file for complete search history.

(56) References Cited

U.S. PATENT DOCUMENTS

| 7,228,437 | B2* | 6/2007 | Spagna | H04W 4/02 |
| | | | | 713/193 |
| 7,370,202 | B2* | 5/2008 | Appenzeller | H04L 9/083 |
| | | | | 726/19 |
| 7,711,960 | B2* | 5/2010 | Scarlata | H04L 9/0897 |
| | | | | 713/168 |
| 11,265,161 | B2 | 3/2022 | Yasmin et al. | |
| 11,265,170 | B2* | 3/2022 | Takemori | G07C 5/085 |
| 2007/0239980 | A1* | 10/2007 | Funayama | G06F 21/32 |
| | | | | 713/155 |
| 2008/0104403 | A1* | 5/2008 | Gueron | H04L 9/3247 |
| | | | | 713/181 |
| 2009/0228704 | A1* | 9/2009 | De Atley | G06F 8/20 |
| | | | | 717/124 |
| 2013/0042115 | A1* | 2/2013 | Sweet | G06F 21/577 |
| | | | | 713/176 |
| 2013/0297422 | A1* | 11/2013 | Hunter | H04H 60/63 |
| | | | | 705/14.58 |
| 2015/0256514 | A1* | 9/2015 | Laivand | H04L 63/105 |
| | | | | 726/3 |
| 2015/0295910 | A1* | 10/2015 | Nairn | H04L 63/126 |
| | | | | 726/7 |
| 2016/0044023 | A1* | 2/2016 | Barr | H04L 9/3268 |
| | | | | 726/1 |

(Continued)

*Primary Examiner* — Thanh T Le
(74) *Attorney, Agent, or Firm* — Quinn IP Law

(57) ABSTRACT

A method and system for authenticating soft part updates to an electronic control unit (ECU) or other processing device is contemplated. The authenticating may include a back office providing authentication data to a programming tool whereupon the ECU interacts with the programming tool to authenticate the soft part updates. The authenticating may optionally include the ECU identifying whether the soft part update is to be authenticated according to different types of authentications.

17 Claims, 3 Drawing Sheets

(56) References Cited

U.S. PATENT DOCUMENTS

| | | | |
|---|---|---|---|
| 2016/0203332 A1* | 7/2016 | Wippler | G06F 21/6245 |
| | | | 726/28 |
| 2016/0297401 A1* | 10/2016 | Haga | H04L 9/0891 |
| 2016/0381080 A1* | 12/2016 | Reddem | H04L 63/205 |
| | | | 726/1 |
| 2017/0111177 A1* | 4/2017 | Oguma | H04L 9/3273 |
| 2019/0020717 A1 | 1/2019 | Carlesimo et al. | |
| 2019/0028448 A1* | 1/2019 | Farrell | H04L 63/062 |
| 2020/0369242 A1* | 11/2020 | Komedani | B60R 25/24 |
| 2020/0382313 A1* | 12/2020 | Oguchi | H04L 67/12 |
| 2022/0078020 A1* | 3/2022 | Banchelin | G06F 21/445 |
| 2022/0094680 A1* | 3/2022 | Mirsky | H04L 43/10 |
| 2023/0006843 A1* | 1/2023 | Lv | H04L 63/00 |
| 2024/0073208 A1* | 2/2024 | Chatsviorkin | H04L 67/143 |

\* cited by examiner

SOFT PART AUTHENTICATION FOR ELECTRONIC CONTROL UNIT

INTRODUCTION

The present disclosure relates to authenticating soft part updates, such as but not necessarily limited to authenticating updates for soft parts included on an electronic control unit (ECU) of a vehicle.

An electronic control unit (ECU) may be considered as a computer, a microcontroller or other processing element configured to provide or otherwise support one or more operations, functions, processes, etc., such as by outputting corresponding signals, data, controls, and the like to a dependent system. ECUs are often standalone devices intended to operate a dependent system on a regular basis, such as to repeatedly analyze information, measurements, values, inputs, etc. for purposes of implementing corresponding output to and control over the dependent system, and in some cases, such as when not directly controlling a dependent system, providing the information, etc. to another ECU or other entity. The underlining componentry of an ECU may vary; however, many are typically considered as including a processor to perform functions according to execution non-transitory instructions stored on an included memory, i.e., the instructions represent the software or other logic used to facilitate the desired operation, function, etc.

ECUs and the like may be considered as an entrenched or fixed type of system when employed in applications where the operations performed therewith are intended to be relatively consistent or similar throughout its lifecycle. Such ECUs may be deployed within the host device so as to have limited accessibility or in locations typically away from user interactions, and as a result, may lack user interfaces or human machine interfaces (HMIs). Such ECUs may instead rely upon wired or wireless connections, such as over a network or through another communication, to facilitate interactions with other ECUs, devices, sensors, dependent systems, etc. By way of example, when employed with a vehicle, such as an automobile, various ECUs may be used as an engine control module (ECM), a telematics unit (TU), a powertrain control module (PCM), a transmission control module (TCM), a brake control module (BCM), a central control module (CCM), a central timing module (CTM), a passenger door module (PDM), a system control module (SCM), an airbag control module (ACM), a battery management system (BMS), a general electronic module (GEM), a body control module (BCM), a suspension control module (SCM), and more.

The ECUs may periodically require updates, which in the case of the noted automobile type of ECUs, may be associated with design updates, calibration changes, new or altered functions, and other changes typically associated with altering software, code, firmware, datasets, files, and the like. These features or constructs may be referred to as soft parts, as soft parts are generally understood to encompass such features. Accordingly, some updates may relate to changing code or software for purposes of altering a function whereas some other updates may relate to adjusting calibration tables, adding data for lookup functions, or revising informational values that are relied upon but not necessarily associated with changing functionality. The means and methods by which ECUs communicate with each other and other entities for updating soft parts or otherwise making operational changes may vary according to the implementation, and often according to standards and protocols associated with the host device.

Unified Diagnostic Services (UDS) is, at least in the case of some automobiles, a commonly used diagnostic communication protocol to facilitate updating automobile electronics like an ECU. International Organization for Standardization maintains a standard for the UDS entitled ISO 14229-1 Road vehicles—Unified diagnostic services (UDS), which is hereby incorporated by reference in its entirety. One valuable aspect of UDS is a service aimed at preventing or thwarting unwanted actors from making updates without proper authentication. The service identifier (SID) associated with the corresponding security access is typically referenced with respect to request SID 0x27 and response SID 0x67, which relates to a seed-based request-response strategy. The strategy enables an authentication process whereby an ECU generates and transmits a seed to a programming tool that the programming tool then responsively used to generate and transmit a key back to the ECU. The ECU then authenticates the programming tool to make updates to the ECU depending on whether responsive key, i.e., the key from the programming tool, matches the key of the ECU. UDS, at least in this manner, effectively authenticates actor access to the ECU, and thereby, resulting permission to make updates, as long as the actor is capable of providing a matching key.

SUMMARY

Disclosed herein is an authentication method and system for authenticating updates to soft parts, for example, by requiring a programming tool or other entity attempting to update soft parts of an ECU or other controller to not only have access to a soft part signing system or soft part signing key, i.e., a key trusted by an ECU, but to also perform additional authentications aimed at assuring soft part updates provided from a trusted authority or service being unaltered when implemented at the ECU. The contemplated authentication capabilities help ensure an authorized soft part vendor, such as an original equipment manufacturer (OEM), are able to secure access to ECUs when updating soft parts such that updates are limited to authorized soft parts and such that the chances of an unwanted actor making changes or otherwise intervening in the updates is mitigated.

A method of authenticating a soft part update for an electronic control unit (ECU) is disclosed. The method includes determining send key information included within a send key request transmitted to the ECU from a programming tool and identifying from the send key information whether the soft part update is to be authenticated according to a first type of authentication or a second type of authentication. The ECU may be configured to perform both of the first and second types. The first type permits the ECU to update responsively to completing an unlock key authentication. The second type permits the ECU to update responsively to authenticating a message digest created for the soft part in addition to completing the unlock key authentication.

The method may include requiring the ECU to perform a challenge authentication in order to determine whether the update is to be authenticated according to the first type or the second type, e.g., to perform the authentication according to the first time when the challenge authentication is unsuccessful and according to the second type when successful.

The method may include determining the challenge authentication to be successful when the ECU generates and matches both of a challenge message authentication code (MAC) and a response MAC to corresponding challenge and response MACs included within the send key information.

The method may include requiring the ECU to generate the challenge MAC by signing a challenge with an unlock key, and optionally, to generate the challenge by setting a most significant bit of a subfunction prior to concatenating the subfunction with a seed after the ECU generates the seed by concatenating an ECU identifier (ID) with a random number. The ECU may generate the response MAC by signing a first constant with a session key.

The method may include matching no more than an x most significant bits of the challenge MAC generated with the ECU to the challenge MAC included within the send key information, and matching no more than an y most significant bits of the response MAC generated with the ECU to the response MAC included within the send key information, e.g., x may be 16 and y may be 12 such that the 16 most significant bits of the challenge MAC are matched and the 12 most significant bits of the response MAC are matched.

The method may include requiring the ECU to complete each of a data authentication and a module authentication after the challenge authentication and before updating the soft part.

The method may include determining the data authentication to be completed when the ECU generates and matches a data MAC to a corresponding data MAC included within an additional authentication request—the additional authentication request being transmitted to the ECU from the programming tool after the challenge authentication.

The method may include requiring the ECU to generate the data MAC by signing the message digest with a shared secret. The message digest may be included within the send key information and generated therebefore by processing the soft part according to an algorithm.

The method accordingly may include determining the module authentication to be completed when the ECU verifies module IDs identified with the programming tool to match with module IDs included thereon and optionally verifies a signature of the soft part before updating the soft part—the signature being included with the send key information.

The method may include the unlock key authentication requiring the ECU to have stored thereon an unlock key matching an unlock key included within the send key information.

A method of authenticating a soft part update for an electronic control unit (ECU) of a vehicle is disclosed. The method may, according to information transmitted to the ECU from a programming tool, include authenticating the soft part update responsively to the ECU verifying an unlock key and a message digest of the soft part, whereby the unlock key and the message digest are included within the information and the message digest is provided to the programming tool from a back office to authenticate the soft part update.

The method may include the ECU determining the message digest to be verified when a message authentication code (MAC) associated therewith and included within the information matches with a corresponding MAC generated by the ECU.

A system for authenticating a soft part to an electronic control unit (ECU) of a vehicle is disclosed. The system may include a back office configured for generating a message digest and a signature for the soft part, e.g., the back office may generate the message digest and the signature responsively to verifying authenticity of an update to the soft part. The system may include a programming tool configured for including the message digest and the signature with information provided to the ECU—the ECU determining whether to verify the update responsively to the information.

The programming tool may include an unlock key and a message authentication code (MAC) for the message digest within the information whereupon the ECU responsively determines the update to be verified when the MAC, the signature and the unlock key match with a MAC, a signature and an unlock key locally determined by the ECU.

The above features and advantages, and other features and attendant advantages of this disclosure, will be readily apparent from the following detailed description of illustrative examples and modes for carrying out the present disclosure when taken in contact with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1:
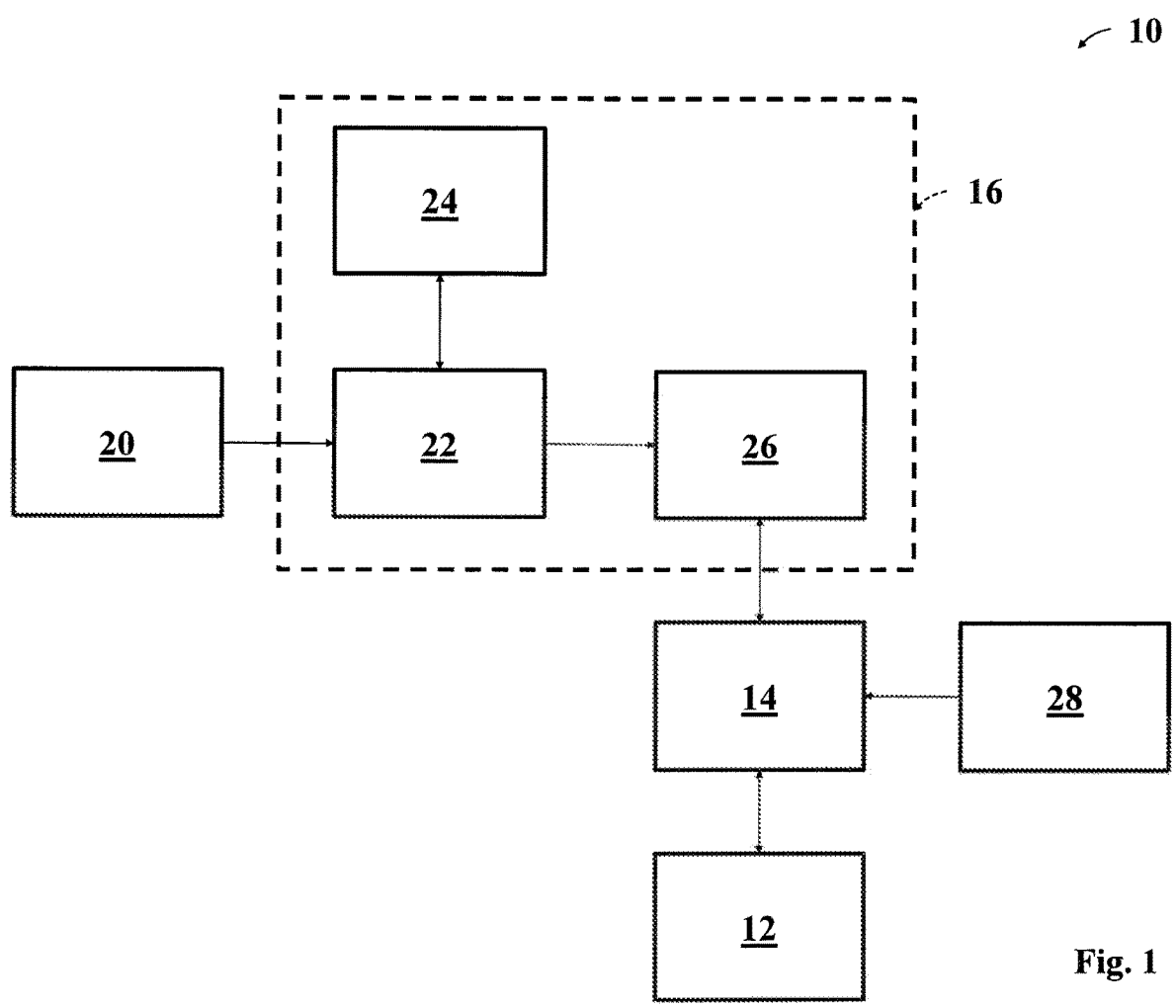
FIG. 1 illustrates a system for authenticating soft part updates in accordance with one non-limiting aspect of the present disclosure.

The appended drawings are not necessarily to scale and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The present disclosure may be embodied in many different forms. Representative examples are shown in the various drawings and described herein in detail as non-limiting representations of the disclosed principles. To that end, elements and limitations described in the Abstract, Introduction, Summary, and Detailed Description sections, but not explicitly set forth in the appended claims, should not be incorporated into the claims, singly or collectively, by implication, inference, or otherwise. Moreover, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation".

Words of approximation such as "about", "almost", "substantially", "generally", "approximately", etc., may be used herein in the sense of "at, near, or nearly at", or "within 0-5% of", or "within acceptable manufacturing tolerances", or logical combinations thereof. Also as used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function. Spatially relative terms, such as "inner," "outer," "beneath," "below," "lower," "above," "upper," and the like, may be used herein for ease of description to describe one element or feature's relationship to another element(s) or feature(s) as illustrated in the drawing figures. Spatially relative terms may be intended to encompass different orientations of the device or system in use or operation in addition to the orientation depicted in the drawing figures.

Referring now to the drawings, wherein like reference numbers refer to like features throughout the several views, FIG. 1 illustrates a system 10 for authenticating soft part updates in accordance with one non-limiting aspect of the present disclosure. The system is predominantly described with respect to facilitating updates for an electronic control unit (ECU) 12 included on an automobile for exemplary purposes as the present disclosure fully contemplates its use and application in securing updates to devices other than ECUs and updates to non-automobile devices. The system 10 mainly operates according to interactions between a programming tool 14, a back office 16, and the ECU 12 whereby each cooperates to facilitate authenticating soft part updates according to the processes and methodologies contemplated herein. While not shown in detail, each may include a processor configured for executing non-transitory instructions on an included memory to facilitate the various operations, functions, and activities described herein, and likewise, each may also include suitable interfaces, connections, communication capabilities, etc. needed to implement the same.

The back office 16 may be considered as a trusted authority, such as one under the control or direction of an original equipment manufacturer (OEM), tasked with validating soft parts for update. The soft parts requiring update may be provided from internal and/or external sources 20 and delivered to a soft part release system 22 for validation. The validation may consist of an administrator deciding whether the soft part is suitable for an update, which optionally may include identifying ECUs intended for the corresponding update as well as module IDs and other information needed to coordinate installation. The soft part release system 22 may include a database capable of storing and cross-referencing soft parts with ECU identifiers (IDs) and module IDs such that the release system 22 may effectively maintain an up-to-date version of the soft parts authorized for each ECU 12. Each soft part may be comprised of or otherwise associated with ECU IDs, module IDs, part numbers etc. to coordinate the use thereof with files, datasets, or other content having the software, code, programming, etc. forming the soft part, i.e., the information to be programmed into the ECU 12 may be contained within a corresponding file or structure capable of being transmitted to and acted upon by the ECU 12 to facilitate the installation thereof after the authentication contemplated herein is achieved.

The back office 16 is shown to include security features associated with a soft part signing system 24 and an ECU unlock security server 26. The signing system 24 and the security server 26 may cooperate to facilitate securing the authentication measures used to authenticate soft parts for update. The security measures may store information for enabling various cryptographic processes and manipulations, including capabilities for making use of keys, hashing algorithms, media authentication codes (MACs), shared secrets, etc. The release system 22 may be used to generate a message digest for each soft part that is then provided to the security server 26 to generate verification data (e.g., MAC) according to a shared secret known to each ECU 12 intended to be in receipt thereof, such as by concatenating and then signing the message digests and associated soft part numbers and the module IDs with the shared secret. This ensures that the security server 26 provides additional authentication data to the ECU 12 of soft parts that have been authorized for official release in the release system 22. In this way, even if an interloper gains access to the signing system 24 or the soft part signing keys used by the signing system 24, the ECU 12 may still detect that the provided soft part update is not authentic. The security server 26 may be responsible for tracking unlock keys, shared secrets and the like, and is shown for exemplary purposes as being separate from the signing system 24, merely to highlight one aspect of the present disclosure whereby the keys, secrets, etc. associated with each ECU 12 may be maintained separately from the soft part signing system 24. This bifurcation may be helpful in enabling the soft part release system 22 to be integrated with existing ECU security systems 26 so that the present disclosure can be incorporated into existing control structures. The security server 26 can interact with the release system 22 and/or the signing system 24 to provide keys, shared secrets and other information thereto for purposes of generating the message digest and other data sets.

The programming tool 14 may interact with the security server 26 and/or other elements of the back office 16 to facilitate authenticating soft parts with the ECU 12. The programming tool 14 may correspond with a device having capabilities sufficient to interact with the ECU 12. The programming tool 14, for example, may correspond with a standalone tester capable of being connected to a network or directly to the ECU 12, e.g., the tester, in the case of a vehicle, may connect to a vehicle network in communication with the ECU 12, and/or the tester may plug directly into a receptable or interface of the ECU 12. The programming tool 14, optionally instead of being an independent tester, may be included within a module or another ECU of the device having the ECU requiring a soft part update, e.g., one ECU may act as a programming tool for another ECU. The programming tool 14 may also be located remotely from the device having the ECU 12, such as to facilitate wireless or over-the-air (OTA) updates. The programming tool 14 may include a user interface or a human-machine-interface (HMI) to facilitate interacting with an administrator when needed for entering information and commands associated with user dependent aspects of facilitating an update.

The programming tool 14 may be a generic item or non-specific to the ECU 12 or the device insofar as it may require information, files, and other data to be loaded thereon. A utility file 28 may be included to provide the desired or specific information to the programming tool 14, e.g., the utility file 28 may include a copy of the software, calibration tables, coding, etc. associated with the soft parts, i.e., the data sets to be provided to the ECU 12 for update, as well as other information to facilitate the authentication contemplated herein. The utility file 28 may be stored on the programming tool 14 or otherwise provided thereto, such as from the back office 16 through wired or wireless communications. One aspect of the present disclosure contemplates the programming tool 14 being utilized by vehicle technicians or owners while working on the device or otherwise in an environment where they may need to interact with the programming tool 14 while the programming tool is out of range or not in communication with the back office 16. This can be accomplished by loading the program tool 14 with the utility file 28 ahead of time so that it can thereafter be taken to the device having the ECU 12. The need to have a separate programming tool 14 or to pre-load the programming tool 14, of course, may not be desired, particularly as the scope of wireless communications increase, such that some or all the interactions described herein may occur directly between the back office 16 and the ECU 12 through wired or wireless signaling.

Figure 2A:
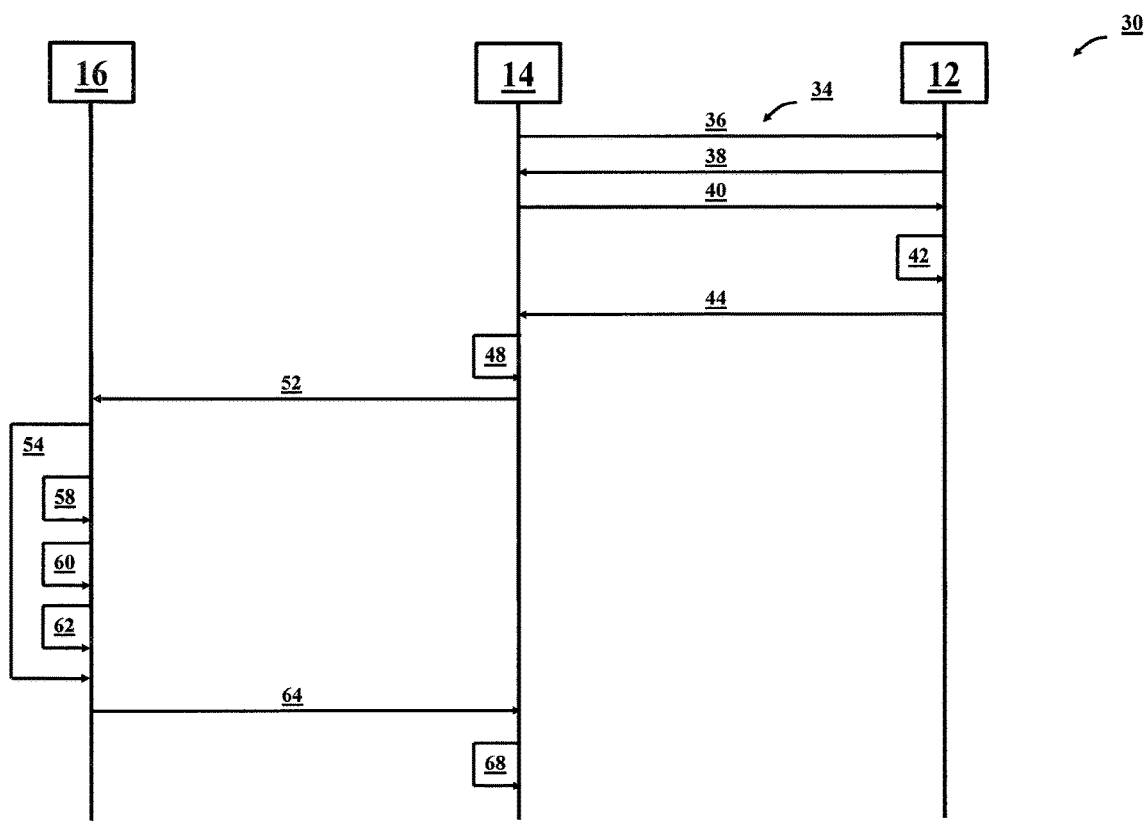
FIGS. 2a-b schematically illustrates a diagram associated with a method for authenticating soft part updates in accordance with one non-limiting aspect of the present disclosure.
Figure 2B:
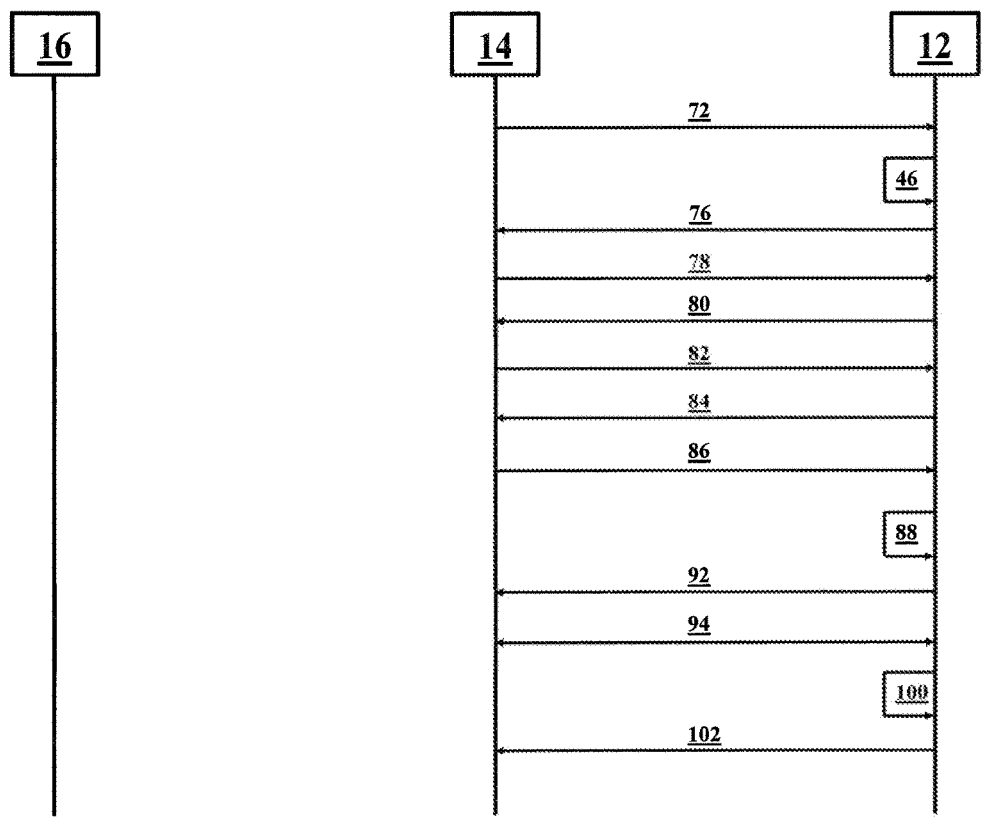

FIGS. 2a-b schematically illustrate a diagram 30 associated with a method for authenticating soft part updates in accordance with one non-limiting aspect of the present disclosure. The method, and corresponding infrastructures associated with the back office 16, programming tool 14 and ECU 12, is predominantly described for exemplary purposes relative to at least some of the messaging and interactions associated with the UDS security access. In particular, various messages, responses, requests, processes, and sequences are described for non-limiting purposes with respect to UDS, and request SID 0x27 and response SID 0x67, as the present disclosure fully contemplates its use and application with other protocols and standards, and principally with respect to other sequences and types of messaging, communications, etc. UDS, accordingly, is merely presented as a frame of reference for one type of security protocol commonly in use that may benefit from and be used in cooperation with the additional authentication measures described herein.

A part number authentication 34 is shown to occur according to the programming tool 14 transmitting a part number request 36 to the ECU 12, and the ECU 12 responsively transmitting back a part number response 38. The part number response 38 may include a 16-bit ECU ID and a listing of soft part numbers and module IDs stored on the ECU 12, i.e., a listing of each soft part operating thereon. Each version of the soft part may be assigned a new part number such that the soft part number changes with each version and the module IDs may remain constant. The consistency of the module IDs may be beneficial in assisting in identifying to the ECU 12 memory partitions and other information associated with the storage and use of the soft parts included thereon. The part number response 38 may accordingly include a listing of the soft part numbers cross-referenced with the corresponding module IDs, such as in the form of a file or lookup table.

The programming tool 14 may compare the soft part numbers provided from the ECU 12 to soft parts identified with the utility file 28 to identify soft parts on the ECU 12 requiring update. A soft part may be considered to require an update when a new soft part number is available, e.g., a new version, such as when the programming or code associated therewith changes and/or when calibration files or other information is to be added or otherwise associated with the software. A soft part may also be considered as requiring an update when the soft part is missing or operating improperly on the ECU 12. A soft part update may correspond with a change desired to the software, code, supporting files or tables, and other information stored on the ECU 12 associated with the operation thereof.

Responsively to determining one or more soft parts requiring update, the programming tool 14 may initiate a security access with the ECU 12, optionally in the manner described in UDS whereby the programming tool 14 issues a 0x27 seed request 40. The seed request 40 may prompt the ECU 12 to generate a seed 42 and thereafter transmit the seed 42 to the programming tool 14 within a response 44. The seed 42 may be generated by the ECU 12 concatenating a 16-bit ECU ID with a 15-bit random number that the ECU 12 may also generate. The ECU ID may be a unique identifier for the ECU 12, and the random number may be 15-bit value used as a security measure aimed at ensuring a previously issued seed is not reused. A value instead of a random number may optionally be used if the value is unknown or guard in a manner sufficient to thwart a relay attack.

While it may be instigated prior to or without receiving the soft part numbers, a challenge authentication 46 (see FIG. 2b) may be performed after the programming tool 14 receives the seed 42. The challenge authentication 46 may be used to determine a type of authentication needed for updating soft parts. The present disclosure contemplates a number of authentication stages and processes being employed, and for exemplary non-limited purposes, predominately describes a first type and a second type of authentication. The first type of authentication, which is described below in more detail, may correspond with a seed-based request-response strategy whereby the ECU 12 authorizes a programming session for soft part updates responsively to completing an unlock key authentication, i.e., receiving an unlock key derived at the programming tool 14 or back office 16 from the seed 42, and verifying the soft part being associated with a valid digital signature created by the soft part signing key associated with the signing system 24. The second type of authentication may correspond with a more robust strategy requiring the ECU 12 to complete an additional authentication beyond verifying the unlock key and the signature, i.e., by also requiring the programming tool 14 to provide the ECU with a soft part having a valid message digest created by the signing system 24.

The challenge authentication 46 may include the programming tool generating a challenge 48 by concatenating a subfunction with the seed 42. The subfunction may be used to identify a security clearance or security session for the update. The subfunction, for example, may be used in this manner to identify an entitlement of the programming tool, or more particularly a user thereof, to make certain updates to the ECU 12. An exemplary challenge 48 is shown below.

| Subfunction [1] | ECU_ID [16] | Random Number [15] |
|---|---|---|

Different levels of entitlements may be available for dictating the type of updates the programming tool 14 is permitted to make, which may be dependent on its user, e.g., a plant-level of entitlement may enable one to make more changes to the ECU 12 than a consumer-level of entitlement. One non-limiting aspect of the present disclosure contemplates a dealership-level entitlement whereby a technician or mechanic of a dealership may be able to make updates to the ECU 12 that are less significant than those that can be made at a plant or manufacture location of the ECU 12 but more significant than those that could be made by a consumer or owner of the device having the ECU 12.

A challenge request or message 52 having the challenge 48 and optionally the soft part numbers requiring update may be communicated from the programming tool 14 to the back office 16 for an authentication analysis 54. The analysis 54 may include the back office 16 utilizing the soft part numbers to identify the soft parts requiring update and the corresponding message digest and module ID(s) associated therewith. The analysis 54 may also use the subfunction to determine whether the programming tool 14 is entitled to make certain updates, e.g., the back office 16 may filter or limit the message digest or other updating information provided to the programming tool 14 according to the level of entitlement associated with the subfunction such that some updates may be prevented altogether or limited according to the level entitlement. The analysis 54 may also include determining whether an authentication of the first type or the second type is needed for updating the soft parts. The ability of the back office 16 to determine whether the authentication should be the first type or second type may be beneficial in enabling the use thereof to be selectively determined, such as according to capabilities of the ECU 12, the entitlements associated with the programming tool 14 and/or depending on whether the associated soft part has completed the validation process associated with the soft part release system 22.

The analysis process 54 may include setting a most significant bit of the subfunction included within the challenge 48 to 1 when the second type of authentication is required and leaving the most significant bit as 0 when the first type of authentication is required. The setting of the most significant bit in this manner is considered as a design parameter based on the subfunction typically including a number of zeros at a beginning thereof such that the setting thereof from 0 to 1 is effectively a non-event insofar as having no influence on the security level identified with the subfunction. While other mechanisms may be employed to designate whether an update should be performed according to the first or second type of authentication, setting of the most significant bit in this manner may be sufficient to instruct the ECU 12 whether to undertake the first or second type of authentication. The analysis process 54 may include generating a first counter marking a point in time or other temporal reference that can be used in thwarting an anti-replay use of information associated therewith, e.g., to assure a timing relation between the generation and use of the security measures contemplated herein.

The analysis process 54 may include generating a challenge message authentication code (MAC) 58, which may be referred to as a session key, by signing the challenge 48 with an unlock key (ECUuk) associated with the ECU 12 after the most significant bit of has been set to 1 or left at 0, i.e., the challenge MAC 58 includes the subfunction with the most significant bit being set or left unset depending on the type of authentication. An exemplary challenge MAC 58 is shown below.

---
MAC(ECUuk,challenge)
---

The analysis process 54 may additionally include generating a data MAC 60 by signing additional authentication data with a shared secret key known to the back office 16 and the ECU 12, which optionally may be derived from the unlock key. The added authentication data may correspond with a concatenation of the soft part number(s) and and/or module ID(s) with the corresponding message digest(s). In other words, the message digest may correspond with the soft part(s) being hashed or fingerprinted at the back office 16 with an algorithm such that the added authentication data corresponds with the message digest for each soft part and additional information concatenated therewith. An exemplary data MAC 60 is shown below.

---
MAC(shared secret,additional authentication data)
---

A counter MAC 62 may be separately generated by signing the first counter with the shared secret. An exemplary counter MAC 62 is shown below.

---
MAC(shared secret,first counter)
---

The challenge MAC 58, the data MAC 60 and the counter MAC 62, as well as the challenge 48, the additional authentication data and the first counter, may be transmitted from the back office 16 to the programming tool 14 in a message 64 when the second type of authentication is determined. In the event the first type of authentication is determined, the message 64 may instead include the challenge MAC 58. The programming tool 14 may generate a response MAC 68 as a function of the information included within the message 64 by signing a first constant with the challenge MAC 58 (i.e., session key). The response MAC 68 may be generated regardless of whether the authentication is to be of the first or second type, i.e., the information contained within the response MAC 68 may be used for both of the authentications contemplated herein. The first constant may be used to generate an additional key for purposes of separating using different keys for different stages as an additional security measure. An exemplary response MAC 68 is shown below.

---
MAC(session key,first constant)
---

The programming tool 14 may transmit a corresponding request 72 to the ECU 12, such as with a 0x27 send key request. The ECU 12 processes the send key request 72 to determine whether the first or second type of authentication is required such that the decision associated therewith effectively completes the challenge authentication 46. The send key request 72 may include the data MAC 60, the counter MAC 62 and/or the response MAC 68, as well as the challenge 48, the additional authentication data, the first counter, and the first constant. The response MAC 68 may optionally be limited to the x most significant bytes to provide an additional security option, i.e., x may be set to 12 or other number in order to limit the most significant bytes being used according to a design parameter likely to be unknown to an interloper.

The ECU 12 may perform a matching operation in response to receipt of the response messages 72 by calculating its own values for the information received in the send key request 72 and then comparing its calculations to the information/values received within the send key request 72. The challenge authentication 46 may use the quantity of matches, if any, to decide whether security access should be granted, and if security access is granted, whether the first or second type of authentication is required. One non-limiting aspect of the present disclosure contemplates the ECU comparing a y (e.g., 16) most significant bytes of the MAC challenge 58 and the 12 most significant bytes of the response MAC 68 for purposes of performing the matching operation. The matching operation may optionally be performed initially with the ECU 12 calculating its values without setting the most significant bit of the challenge 48, i.e., calculating the challenge MAC 58 with the most significant bit of the subfunction being unset.

If the ECU 12 calculated values when the most significant bit is unset matches with that received within the send key request 72, then the ECU 12 determines security access to be verified due to the matching and that the first type of authentication is to be performed due to the matching occurring while the most significant bit of the subfunction is unset. If the ECU 12 calculated values fail to match with the corresponding values in the send key request 72, then the ECU may perform another matching with the most significant bit of the subfunction being set. If this subsequent operation results in a matching, then the ECU 12 determines security access to be verified due to the matching and that the second type of authentication is required due to the matching occurring while the most significant bit of the subfunction was set. If the ECU 12 fails to obtain a match after completing both matching operations, then the ECU determines security access to be unverified and denies the security access request to perform soft part updates.

The ECU 12 may set a security access flag and an additional authentication required flag set according to the results of the matching operations, e.g., setting the security access flag to true when a match is verified, setting the additional authentication flag to false when the first type of authentication is required, and setting additional authentication flag to true when the second type of authentication is required. The ECU 12 may transmit a corresponding response 76 to the programming tool 14, such as with a 0x27 send key response, to notify the programming tool 14 as to whether security access has been granted or denied, i.e., whether the soft part update is permitted. Either through additional communication from the back office 16 or information included within the utility file 28, the programming tool 14 may be aware of whether the first or second type of authentication is required. If the programming tool 14, however, is unaware, the send key response 76 may optionally include information indicating whether the first or second type of authentication is required.

The programming tool 14 may responsively transmit a counter request 78 to the ECU 12 having the first counter. The ECU 12 may then store the first counter to mark when information associated with the authentication challenge 46 was generated. A counter response message 80 may be responsively transmitted to confirm the ECU 12 accepting the first counter. The programming tool 14 may then transmit an enter programming session request 82 to indicate to the ECU 12 an intention to begin the soft part update. The ECU 12 may responsively generate an enter programming session response 84 indicating readiness to commence the soft part update. In the event the second type of authentication is required to complete the soft part update, the programming tool 14 transmits an additional authentication data request 86 to the ECU 12. The additional authentication request 86 may include the data MAC 60 the additional authentication data and a second counter with the second counter being used to temporally identify timing of the request 86.

The ECU 12 may commence a data authentication process 88 in response to the additional authentication data request 86. The data authentication process 88 may correspond with the ECU 12 verifying whether the second counter is greater than the first counter, and if so, calculating its own data MAC for the additional authorization data and comparing it to the data MAC 60. The ECU 12 may generate an additional authentication MAC by signing the additional authentication data with an additional authentication key. The additional authentication key may be generated by the ECU 12 to mimic the shared secret such that the additional authentication MAC determined at the ECU 12 can be compared to the data MAC 60 received from the back office 16. The additional authentication key, for example, may be generated by signing an additional authentication key constant with the unlock key stored therein, or optionally, a key derived therefrom.

In the event of the match, the ECU 12 determines the additional authentication data provided from the programming tool 14 to be valid. The ECU 12 may thereafter responsively store some or all of the message digests of the soft parts corresponding to the module IDs for use in facilitating updating the memory of the ECU 12. The ECU 12 may transmit an additional authentication data response 92 to the programming tool 14 when the ECU 12 determines the additional authentication data generated at the back office 16 to be properly received, i.e., that it has been verified as being untampered since transmission from the back office 16.

A data transfer process 94 may commence with the programming tool 14 in the ECU 12 exchanging response and request messages whereby the soft part is provided to the ECU 12 and the ECU 12 responsively erases partitions and otherwise facilitates the download thereof. Prior to installing the soft part and/or allowing it to be executed, a module authentication process 100 may correspond with the ECU 12 verifying the authenticity of the provided soft part, such as by generating the message digest of the provided soft part and comparing it with the stored soft part message digests provided by the programming tool 14, corresponding with module IDs included on the ECU 12 in additional to verify the signature of the soft part is valid. The module IDs may be used to identify particular partitions or other aspects of the ECU 12 requiring update, and as such, the verification thereof may be a useful last step before the ECU 12 permits installation of the software. The ECU 12 may transmit a transfer data response 102 upon verifying the update.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method of authenticating a soft part update for an electronic control unit (ECU) comprising:
determining send key information included within a send key request transmitted to the ECU from a programming tool;
identifying from the send key information whether the soft part update is to be authenticated according to a first type of authentication or a second type of authentication, the ECU being configured to perform both of the first and second types, the first type permitting the ECU to update responsively to completing an unlock key authentication, the second type permitting the ECU to update responsively to authenticating a message digest created for the soft part in addition to completing the unlock key authentication, and
requiring the ECU to perform a challenge authentication in order to determine whether the update is to be authenticated according to the first type or the second type, the ECU being required to authenticate according to the first type when the challenge authentication is unsuccessful and according to the second type when the challenge authentication is successful.

2. The method according to claim 1 further comprising determining the challenge authentication to be successful when the ECU generates and matches both of a challenge message authentication code (MAC) and a response MAC to corresponding challenge and response MACs included within the send key information.

3. The method according to claim 2 further comprising requiring the ECU to generate the challenge MAC by signing a challenge with an unlock key.

4. The method according to claim 3 further comprising requiring the ECU to generate the challenge by setting a most significant bit of a subfunction prior to concatenating the subfunction with a seed, the ECU generating the seed by concatenating an ECU identifier (ID) with a random number.

5. The method according to claim 4 further comprising requiring the ECU to generate the response MAC by signing a first constant with a session key.

6. The method according to claim 5 further comprising matching no more than an x most significant bits of the challenge MAC generated with the ECU to the challenge MAC included within the send key information.

7. The method according to claim 6 further comprising matching no more than an y most significant bits of the response MAC generated with the ECU to the response MAC included within the send key information.

8. The method according to claim 7 further comprising selecting the x to be 16 and the y to be 12 such that the 16 most significant bits of the challenge MAC are matched, and the 12 most significant bits of the response MAC are matched.

9. The method according to claim 5 further comprising requiring the ECU to complete each of a data authentication and a module authentication after the challenge authentication before updating the soft part.

10. The method according to claim 9 further comprising determining the data authentication to be completed when the ECU generates and matches a data MAC to a corresponding data MAC included within an additional authentication request, the additional authentication request being transmitted to the ECU from the programming tool after the challenge authentication.

11. The method according to claim 10 further comprising requiring the ECU to generate the data MAC by signing the message digest with a shared secret.

12. The method according to claim 11 further comprising the message digest being included within the send key information and generated therebefore by processing the soft part according to an algorithm.

13. The method according to claim 12 further comprising determining the module authentication to be completed when the ECU verifies module IDs identified with the programming tool to match with module IDs included thereon.

14. The method according to claim 13 further comprising requiring the ECU to verify a signature of the soft part before updating the soft part, the signature being included with the send key information.

15. The method according to claim 1 further comprising the unlock key authentication requiring the ECU to have stored thereon an unlock key matching an unlock key included within the send key information.

16. A method of authenticating a soft part update for an electronic control unit (ECU) of a vehicle, the method comprising:

according to information transmitted to the ECU from a programming tool, authenticating the soft part update responsively to the ECU verifying an unlock key and a message digest of the soft part, the unlock key and the message digest being included within the information, the message digest being provided to the programming tool from a back office to authenticate the soft part update; and the ECU determining the message digest to be verified when a message authentication code (MAC) associated therewith and included within the information matches with a corresponding MAC generated by the ECU.

17. A system for authenticating a soft part to an electronic control unit (ECU) of a vehicle, the system comprising:

a back office configured for generating a message digest and a signature for the soft part, the back office generating the message digest and the signature responsively to verifying authenticity of an update to the soft part;

a programming tool configured for including the message digest and the signature with information provided to the ECU, the ECU determining whether to verify the update responsively to the information; and wherein the programming tool includes an unlock key and a message authentication code (MAC) for the message digest within the information, the ECU responsively determining the update to be verified when the MAC, the signature and the unlock key match with a MAC, a signature and an unlock key determined by the ECU.

* * * * *